March 22, 1966  F. S. FELL ETAL  3,241,300
WINDROWER-CONDITIONER
Filed March 17, 1964  2 Sheets-Sheet 1
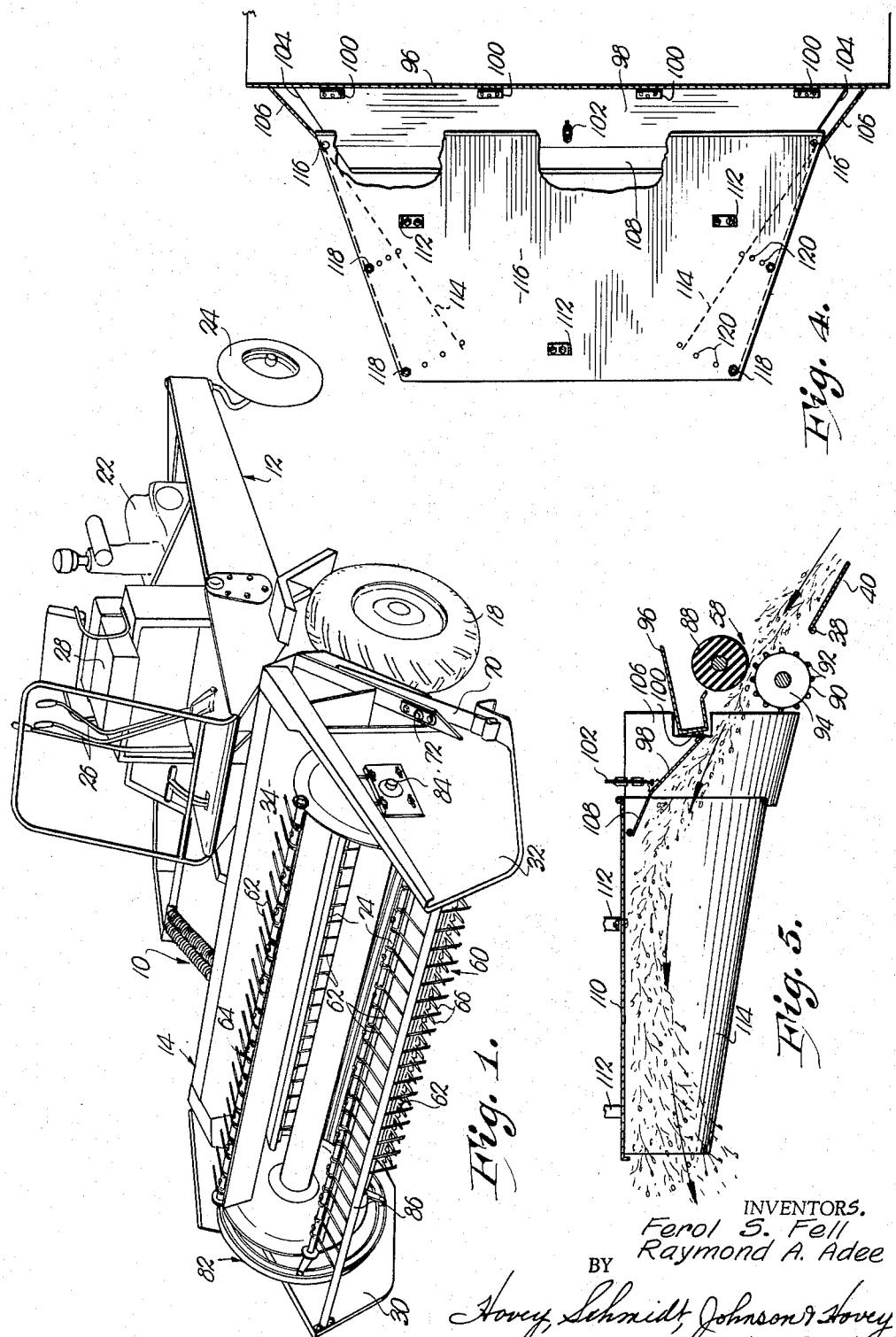
INVENTORS.
Ferol S. Fell
Raymond A. Adee
BY
Hovey, Schmidt, Johnson & Hovey
ATTORNEYS.

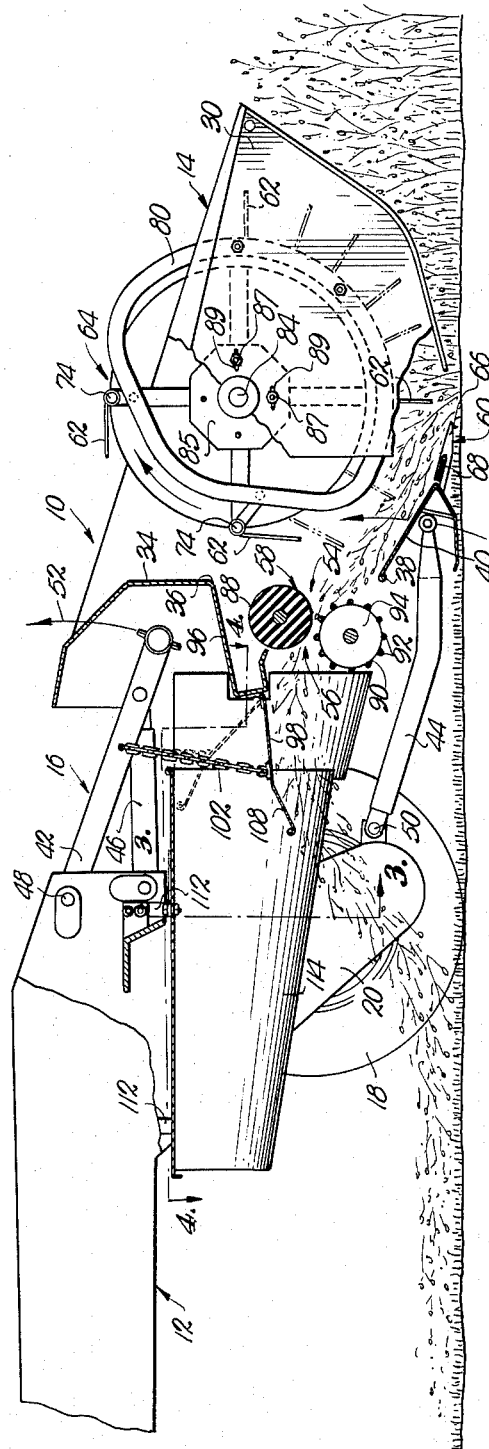

3,241,300
WINDROWER-CONDITIONER
Ferol S. Fell and Raymond A. Adee, Newton, Kans., assignors to Hesston Manufacturing Company, Inc., Hesston, Kans., a corporation of Kansas
Filed Mar. 17, 1964, Ser. No. 352,555
5 Claims. (Cl. 56—23)

This invention relates to harvesting wherein a crop is cut, conveyed, conditioned and deposited by a single, continuous operation, having as an important object the provision of an improved, relatively simple method and construction with high efficiency yet low manufacturing and harvesting costs, thereby placing the machine and method within the economic reach of more users, particularly those having relatively small crop areas to harvest.

Another important object of the instant invention is to provide a harvesting operation which functions in a manner such that the steps of projecting, conditioning and windrowing of the crop which is cut are all accomplished successively, smoothly, and uninterruptedly, while the cut crop is maintained entirely off the ground.

A further object of this invention is the provision of a system which deflects the cut crop following the conditioning operation in a manner such that the crop may be deposited on the ground either in a swath or in a windrow, whichever is desired.

A still further object of the present invention is to control the width of the windrow deposited on the ground.

In the drawings:

FIGURE 1 is a front-top perspective view of a windrower-conditioner made pursuant to the present invention and capable of carrying out the steps of our novel harvesting method;

FIG. 2 is a side elevational view of the windrower-conditioner partly broken away and in section for clearness;

FIG. 3 is a fragmentary cross-sectional view taken along line 3—3 of FIG. 2;

FIG. 4 is a fragmentary, cross-sectional view taken along irregular line 4—4 of FIG. 2, parts being broken away to reveal details of construction; and FIG. 5 is a view partially similar to FIG. 2 but illustrating an alternate manner of use.

The harvesting machine 10 includes a vehicle 12, header apparatus 14 at the normally forwardmost end of the vehicle 12 and three-point linkage 16 mounting apparatus 14 on vehicle 12.

Vehicle 12 includes a pair of forward, ground-engaging wheels 18 driven by steering and transmission structures (not shown) partly enclosed in respective housings 20 and coupled with an engine 22 carried by vehicle 12, and a rear caster wheel 24. The transmission structures are controlled by a pair of levers 26 manipulatable by an operator positioned on seat 28.

Header 14 includes a pair of sides 30 and 32 which extend forwardly from linkage 16 and a back 34 spanning the distance between and secured to the rearmost extremities of sides 30 and 32. Back 34 has a lowermost edge 36 which terminates above the rearmost and uppermost longitudinal edge 38 of an elongated, inclined ramp 40 secured to and spanning the distance between sides 30 and 32 and disposed transversely of the path of movement of vehicle 12.

Linkage 16 includes an upper median link 42 and a pair of spaced lower links 44 all pivotally carried by vehicle 12 and all pivotally attached to header 14. A piston and cylinder assembly 46 is coupled to link 42 and vehicle 12 for raising header 14 as denoted by arrow 52.

Edges 36 and 38 define an opening 54 at the forwardmost extremity of a space 56 which contains conditioning structure 58 hereinafter described. Opening 54 is disposed to receive the crop after the swath has been cut by an elongated cutter mechanism 60 carried on the forward and lowermost edge of ramp 40, and after the cut swath has been conveyed up ramp 40 by tines 62 of a rotatable reel 64.

Cutter mechanism 60 includes a conventional sickle bar having guards 66 and a sickle 68 reciprocable relative to guards 66 by a swingable bar 70 pivotally mounted intermediate its ends on side 32 by pin 72. The uppermost end of bar 70 is coupled to the prime mover 22.

Reel 64 includes a number of circumferentially spaced bars 74, each having a number of longitudinally spaced tines 62 thereon. A crank arm 76 rigid to one end of each bar 74 respectively, has an end 78 within a transversely C-shaped cam 80 rigidly mounted on side 30. A belt and pulley assembly 82 is coupled with shaft 84 of reel 64 to rotate the latter in a clockwise direction when viewing FIG. 2, assembly 82 being coupled with prime mover 22. Shaft 84 is journaled on sides 30 and 32 by bearing structure 85 adjustably secured to the corresponding sides by fasteners 87 extending through slots 89 in the sides as shown in FIG. 2. This construction permits reel 64 to be selectively disposed in any one of a number of fore-and-aft operative locations with respect to conditioning structure 58.

Cam 80 is configured to cause oscillation of bars 74 in predetermined directions and arcs, depending upon the various positions of bars 74. For instance, when bars 74 move downwardly, the latter are rotated so that the tines 62 thereof extend substantially radially outwardly of shaft 84 as shown by dashed lines in FIG. 2. As bars 74 move upwardly and rearwardly, arms 76 rotate the bars in a counterclockwise sense when viewing FIG. 2 so that the tines 62 will extend downwardly and clear conditioner 58. Complete retraction of bars 74 does not occur until tines 62 approach about the halfway mark between the lowest and the uppermost points of their upward paths of travel. This is shown in FIG. 2 wherein tines 62 moving rearwardly and upwardly from the lowest points of their paths of travel serve to convey the cut swath upwardly and rearwardly along ramp 40 and project the same into the conditioning structure 58.

A transversely disposed lean bar 86 spans the distance between sides 30 and 32 at the forward extremities thereof and serves to lean the growing crop forwardly if the crop is as tall as or taller than the distance between lean bar 86 and the ground. In this respect, the downwardly moving tines 62 approaching mechanism 60, serve to comb the crop and position the base of the stalks of the crop vertically, whereby the stalks will be cleanly cut by mechanism 60.

Conditioner structure 58 may include an upper roller 88 of hard rubber, and a lower roller 90 formed of angularly disposed metallic rods 92 secured to opposed ends 94. Rollers 88 and 90 substantially span the distance between sides 30 and 32 so as to condition the cut swath without requiring that the swath be bunched toward the center of header 14 before it is conditioned. Thus, the width of the cut swath is unchanged as it passes from ramp 40 and into the space between rollers 88 and 90. Rollers 88 and 90 condition the crop passing therebetween from opening 54 by intermittently cracking and splitting the stems of the crop lengthwise so that drying of the crop will be enhanced without damage to the crop itself. The type of conditioner illustrated and described herein is disclosed in U.S. Letters Patent No. 3,085,384, such patent being incorporated herein by reference for a full understanding of the nature of conditioner 58. Rollers 88 and 90 are coupled to prime mover 22 so that the crop is projected therefrom after it is conditioned. Roller 90 is disposed slightly rearwardly of roller 88 so that the crop is projected upwardly as well as rearwardly.

A transversely J-shaped extension 96 is rigidly secured to edge 36 of back 34 and extends rearwardly therefrom as shown in FIG. 2. A trapezoidally-shaped deflector panel 98 is pivotally secured by spaced hinges 100 to extension 96 for swinging movement in a vertical plane. A chain 102 coupled to the panel 98 extends upwardly therefrom and is adjustably secured to link 42 for up and down movement therewith.

As shown in FIG. 4, panel 98 has a pair of side edges 104 which converge as the rearmost extremities thereof are approached. Edges 104 extend along the inner faces of a pair of side plates 106 rigidly secured to header 14 and angularly disposed similarly to edges 104. Plates 106 have inwardly curved, lowermost extremities for purposes hereinafter described.

Panel 98 has an angularly disposed, rearmost extremity 108 which cooperates with the major portion of panel 98 to deflect the crop downwardly toward the ground when panel 98 is in the full-line position of FIG. 2, and as the crop is projected upwardly and rearwardly from rollers 88 and 90. The length of panel 98 is substantially equal to the length of rollers 88 and 90.

Panel 98 may be moved to the dashed-line position shown in FIG. 2 by shortening the chain 102. In this position of panel 98 the rearwardly and upwardly projected crop may continue its upward and rearward movement until it strikes the lower face of a substantially horizontally deflector panel 110 rigidly secured by a number of brackets 112 to vehicle 12. A pair of side panels 114 disposed below panel 110 are hingedly mounted thereon so that each side panel 114 may be adjusted to any one of a number of fixed positions angularly disposed relative to the direction of movement of the upwardly and rearwardly projected crop. Hinges 116 pivotally mount the forwardmost ends of each side panel 114 respectively on panel 110. Bolts 118 in selected holes 120 provide in panel 110 secure each side panel 114 in desired positions.

By virtue of this construction, the distance between side panels 114 may be varied. As the projected swath moves rearwardly it is formed into a windrow by side panels 106 and 114, the windrow having a width equal to the distance between the rearmost extremities of side panels 114 as shown in FIG. 3. Side panels 114 are transversely arcuate as the lower longitudinal edges are approached. This configuration of these panels and the construction of side plates 106 permit the panels 114 and plates 106 to at least partially support a portion of the rearwardly moving swath until it reaches the rearmost extremities of side panels 114. Moreover, panels 114 tend to funnel any part of the swath which gravitates toward the ground before the rear extremities of panel 114 are reached.

In operation, machine 10 is used to harvest a growing crop by performing the successive and uninterrupted steps of pushing tall crops forwardly by bar 86, while at the same time, the swath is being swept rearwardly and upwardly by tines 62 toward the cutting zone of mechanism 60. After the swath of the crop has been cut by mechanism 60 it is swept upwardly and rearwardly across ramp 40 by the upwardly and rearwardly moving tines 62, and thereafter, the tines 62 project the cut swath through opening 54 and between rollers 88 and 90. It is to be noted that the cut swath does not, at any time, become bunched or concentrated at any point along ramp 40, the width of the cut swath passing over ramp 40 being substantially equal to the width of the growing swath cut by mechanism 60. The crop is maintained off the ground at all times from the moment it is cut until it is ultimately deposited on the ground after being deflected downwardly either by panel 98 or by panel 110.

As the swath passes between rollers 88 and 90, the crop is conditioned and then projected upwardly and rearwardly by virtue of the rotation of rollers 88 and 90, it being clear that roller 88 rotates in a clockwise sense, and roller 90 rotates in a counterclockwise sense when viewing FIG. 2. After tines 62 move the crop up ramp 40 and toward rollers 88 and 90 the tines 62 are retracted, i.e., are swung to positions substantially tangential to reel 64 so as to clear back 34. Tines 62 remain in this position until they begin to move forwardly and downwardly.

If it is desired to deposit the crop on the ground in the form of a swath, the panel 98 is disposed in the full-line position shown in FIG. 2. The crop is deflected downwardly by panel 98 before the crop reaches panels 114; hence there is no inward movement or bunching of the cut swath by panels 114. The operative position of panel 98 is determined by the length of chain 102 and this, of course, may be adjusted manually by the operator prior to commencing the harvesting operations. It is evident that the swath of the crop is successively cut, projected upwardly and rearwardly, conditioned as it continues to move upwardly and rearwardly, and then deflected downwardly to the ground, all of the operations being performed without at any time allowing the crop to fall to the ground.

When is is desired to form the crop in a windrow, panel 98 is elevated to the dashed-line position by shortening the chain 102. The width of the windrow is determined by the relative positions of side panels 114 which are adjusted prior to commencing operations. The crop projected upwardly and rearwardly by rollers 88 and 90 is deflected downwardly by panel 110 and inwardly by panels 114. The arcuate configuration of panels 114 assures that substantially all of the crop is maintained in the swath until the rearmost extremities of side panels 114 are approached. Thus, the width of the windrow will be substantially uniform.

Adjustments may be readily made to change the positions of side panels 114 if it is desired at any time to vary the width of the windrow, depending upon moisture and crop conditions.

In both tall and short crop the combing action of tines 62 presents the crop to mechanism 60 in a manner such that it is cleanly and uniformly cut at its base without leaving excessive stubble protruding from the ground.

By properly adjusting the operating position of reel 64 relative to conditioning structure 58, the desired tine action on a cut swath can be obtained. Any variation in such tine action due, for instance, to moisture or to the condition of the crop, may be compensated for by re-positioning reel 64.

Having thus described the invention, what is claimed as new and desired to be secured by Letters Patent is:

1. In a harvesting machine:
  elongated cutting mechanism disposed transversely of the path of travel of the machine;
  an elongated, stationary ramp extending along said mechanism and being transversely inclined upwardly and rearwardly therefrom and in disposition to receive a crop cut by said mechanism;
  structure disposed forwardly and above said mechanism for sweeping a swath of a growing crop rearwardly and upwardly into said mechanism, said structure having means for moving the cut swath up said ramp and thereupon projecting the same upwardly and rearwardly beyond the ramp before the cut crop is permitted to fall to the ground;
  and a crop-engaging bar extending transversely of said path of travel above the level of said mechanism and forwardly of said structure.

2. A harvesting machine as set forth in claim 1 wherein is included a crop conditioner above and rearwardly of the ramp within the path of projection of the cut swath.

3. A harvesting machine as set forth in claim 2 wherein is included means above and rearwardly of said ramp within the path of projection of the cut swath for deflecting the latter toward the ground.

4. A harvesting method comprising the successive, uninterrupted steps of sweeping a swath of a growing crop rearwardly and upwardly toward an elongated cutting zone and toward an elongated conditioning area disposed above and to the rear of said cutting zone, cutting the swath at said cutting zone while the crop is being swept thereinto, and thereupon conveying the cut crop smoothly, continuously and uniformly to higher elevations while it is maintained off the ground by:

catching the entire swath of the cut crop at an elongated, transversely inclined station extending upwardly and rearwardly from said zone, said zone, said station and said area being coextensive in length with and parallel to said swath, said area being spaced upwardly and rearwardly from the uppermost and rearmost extremity of said station;

disposing said entire swath of the cut crop over and onto said station by forces applied to the crop from directly above the station continuously in a direction extending upwardly and rearwardly from said zone, and while the crop remains in a condition spread along said station longitudinally of the latter;

combing the swath disposed on said station rearwardly along the entire length of said extremity closely adjacent the latter and along a region extending upwardly therefrom and coextensive in length therewith to forceably direct the swath upwardly and rearwardly into said area;

conditioning said crop within said area while the crop is in flight flowing upwardly and rearwardly from said station; and projecting the crop in a continuous stream flowing along a path normal to, and extending upwardly and rearwardly from said area.

5. The invention of claim 4:

and concentrating the conditioned crop into a relatively small continuous mass by the application of forces above and on two sides of the stream after the crop has been conditioned; and further deflecting the mass toward the ground.

References Cited by the Examiner

UNITED STATES PATENTS

| 2,698,170 | 12/1954 | Foley | 56—1 |
| 3,039,256 | 6/1962 | Witt | 56—1 |
| 3,106,052 | 10/1963 | Ingram | 56—1 |

FOREIGN PATENTS 214,323   2/1958   Australia.

ABRAHAM G. STONE, *Primary Examiner.*

ANTONIO F. GUIDA, *Examiner.*